(12) United States Patent
Tsuji et al.

(10) Patent No.: US 8,098,298 B2
(45) Date of Patent: Jan. 17, 2012

(54) DIGITAL CAMERA RECORDING A COMPOSITE IMAGE

(75) Inventors: Shuji Tsuji, Nagano (JP); Yasumasa Nakajima, Nagano (JP); Masanobu Shirakawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 436 days.

(21) Appl. No.: 12/137,759

(22) Filed: Jun. 12, 2008

(65) Prior Publication Data
US 2008/0246854 A1 Oct. 9, 2008

Related U.S. Application Data

(63) Continuation of application No. 11/003,761, filed on Dec. 6, 2004, now Pat. No. 7,466,350.

(30) Foreign Application Priority Data

Jun. 5, 2002 (JP) ............... P2002-164044
Jan. 14, 2003 (JP) ............... P2003-005485

(51) Int. Cl.
*H04N 5/76* (2006.01)
(52) U.S. Cl. .................. 348/231.3
(58) Field of Classification Search ............ 348/231.99, 348/231.1, 231.2, 231.3
See application file for complete search history.

(56) References Cited

U.S. PATENT DOCUMENTS

| | | | |
|---|---|---|---|
| 6,195,513 B1 * | 2/2001 | Nihei et al. | 396/332 |
| 6,621,524 B1 | 9/2003 | Iijima et al. | |
| 7,466,350 B2 * | 12/2008 | Tsuji et al. | 348/231.99 |
| 2001/0025303 A1 | 9/2001 | Fisher et al. | |
| 2002/0018138 A1 | 2/2002 | Yoshiro | |

FOREIGN PATENT DOCUMENTS

| | | |
|---|---|---|
| EP | 0 647 057 A1 | 4/1994 |
| EP | 0 675 648 A2 | 10/1995 |
| EP | 1093294 A2 | 4/2001 |
| EP | 1 100 262 A1 | 5/2001 |
| JP | 11-8818 A | 1/1999 |
| JP | 11-168689 A | 6/1999 |
| JP | 11-196362 A | 7/1999 |
| JP | 11-298764 A | 10/1999 |
| JP | 2000-298721 A | 10/2000 |
| JP | 2001-45352 A | 2/2001 |
| JP | 2001-127986 A | 5/2001 |

(Continued)

OTHER PUBLICATIONS

English-language machine translation of JP 2000-298721 A.

(Continued)

*Primary Examiner* — James M Hannett
(74) *Attorney, Agent, or Firm* — Sughrue Mion, PLLC

(57) ABSTRACT

A digital camera capable of recording a subject image so that the subject image can be drawn as it is combined with a selected default image and so that the subject image can be drawn separately from the selected default image. The digital camera includes an image processor which creates subject image data based on output of an image sensor and a default image setting unit which stores subject image data in a removable memory together with information for associating background data with the subject image data, whereby the subject image data, rather than the data provided by combining the subject image data and the background data, is stored in the removable memory and the subject image data and the background data are associated with each other.

10 Claims, 14 Drawing Sheets

FOREIGN PATENT DOCUMENTS

| | | |
|---|---|---|
| JP | 2001-177764 A | 6/2001 |
| JP | 2001-285420 A | 10/2001 |
| JP | 2001-326846 A | 11/2001 |
| JP | 2002-44416 A | 2/2002 |
| WO | 90/10251 | 9/1990 |

OTHER PUBLICATIONS

European Search Report dated Jul. 14, 2006.
Patent Abstracts of Japan vol. 2000, No. 04 Aug. 31, 2000 & JP 2000 023123 A (NEC Corp).

* cited by examiner

FIG. 4
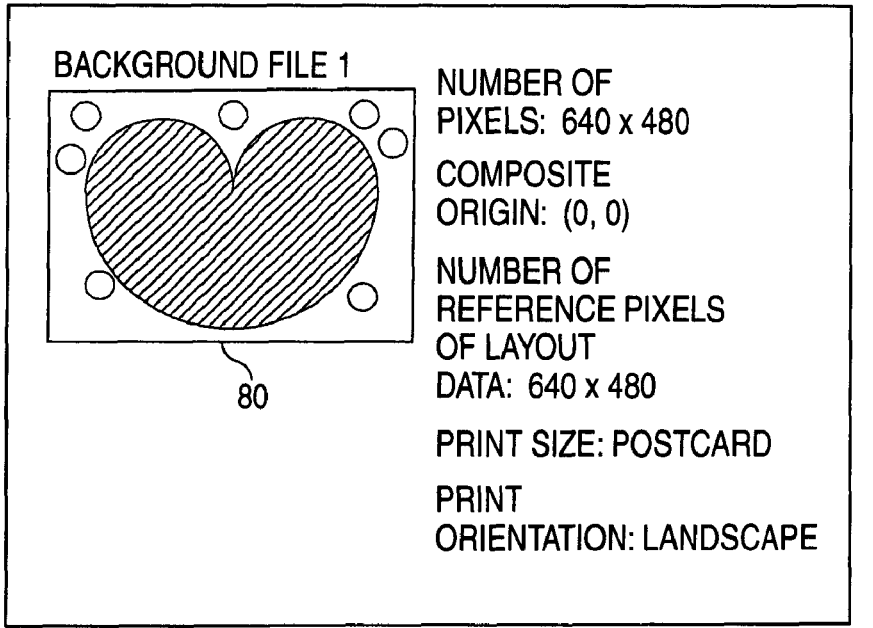
BACKGROUND FILE 1
NUMBER OF PIXELS: 640 x 480
COMPOSITE ORIGIN: (0, 0)
NUMBER OF REFERENCE PIXELS OF LAYOUT DATA: 640 x 480
PRINT SIZE: POSTCARD
PRINT ORIENTATION: LANDSCAPE
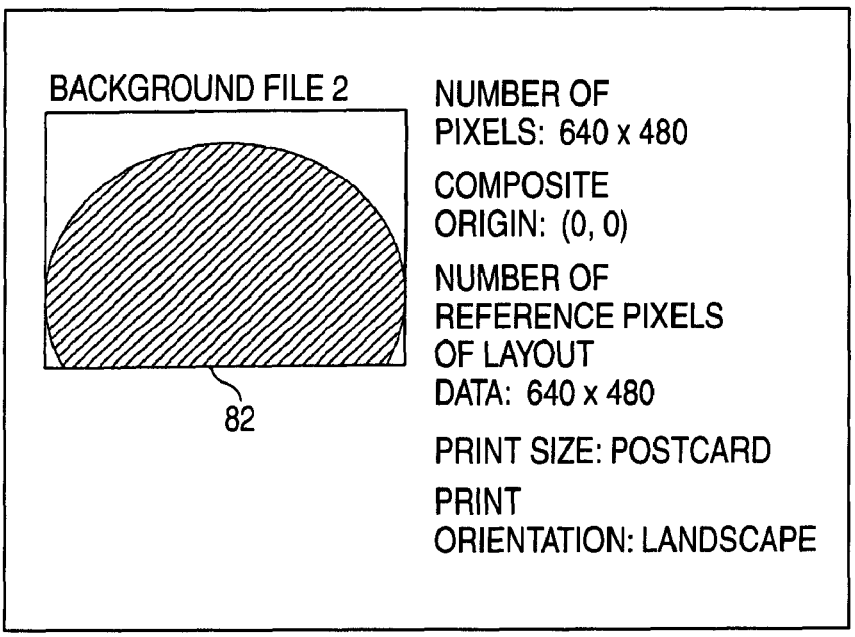
BACKGROUND FILE 2
NUMBER OF PIXELS: 640 x 480
COMPOSITE ORIGIN: (0, 0)
NUMBER OF REFERENCE PIXELS OF LAYOUT DATA: 640 x 480
PRINT SIZE: POSTCARD
PRINT ORIENTATION: LANDSCAPE

FIG. 10 daen01.usd (LAYOUT DEFINITION FILE)

PRINT PAPER SIZE; POSTCARD
PRINT PAPER ORIENTATION; LANDSCAPE

SUBJECT IMAGE DRAWING;
 IMAGE:
 IMAGE FRAME: (x1, x2), (x2, y2)

DEFAULT IMAGE DRAWING;
 IMAGE: birthday.eff
 IMAGE FRAME: (x3, y3), (x4, y4)

FIG. 12 (A)
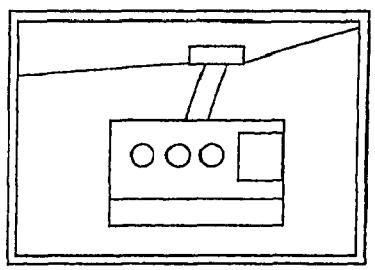
FIG. 12 (B1)
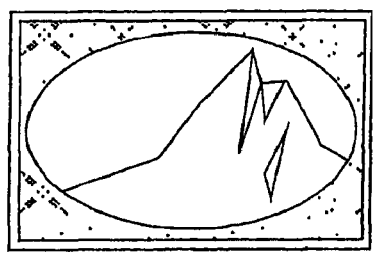
FIG. 12 (B2)
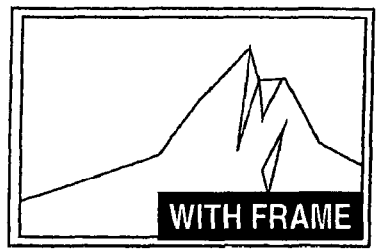
FIG. 12 (C)
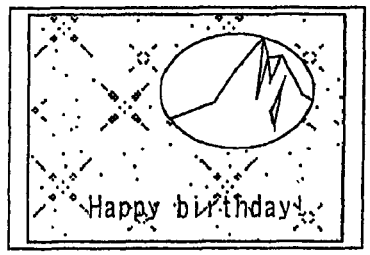

DIGITAL CAMERA RECORDING A COMPOSITE IMAGE

CROSS-REFERENCE TO RELATED APPLICATIONS

This is a Continuation of application Ser. No. 11/003,761 filed Dec. 6, 2004. The entire disclosure of application Ser. No. 11/003,761 is considered part of the disclosure of the accompanying Continuation Application and is hereby incorporated by reference.

TECHNICAL FIELD

This invention relates to a digital camera.

BACKGROUND ART

A digital camera has a use of recording a subject as material of a composite image, for example. The composite image is widely used to print a greeting card with a photo, a framed photo seal, etc.

Hitherto, a digital camera for recording a composite image provided by combining a digital image representing a border and a background (default image) and a digital image representing a subject (subject image) in external memory has been known (for example, refer to patent document 1).

Patent document 1: JP-A-2001-45352

However, according to the digital camera disclosed in patent document 1, the default image and the subject image are combined before they are recorded in the external memory, and thus the subject image before being combined is not recorded in the external memory. Thus, the subject image can be used only for the purpose of being combined with the default image selected before photographing.

Considering such a problem, it is therefore an object of the invention to provide a digital camera capable of recording a subject image so that the subject image can be drawn as it is combined with a selected default image and that the subject image can be drawn separately from a selected default image.

DISCLOSURE OF THE INVENTION

To accomplish the above-described object, a digital camera according to the invention is characterized by image processing means for creating subject image data representing a subject image based on output of an image sensor; and subject image output means for storing subject image data and associating data for associating default image data representing a default image combined with a subject image represented by the subject image data with the subject image data in nonvolatile memory. The subject image data representing the subject image rather than the image provided by combining the subject image and the default image is stored in the nonvolatile memory, whereby the subject image can be recorded so that the subject image can be drawn as it is combined with the selected default image and that the subject image can be drawn separately from the selected default image.

Further, the digital camera according to the invention is characterized in that the subject image output means stores associating data for associating a plurality of pieces of default image data with one piece of subject image data in the nonvolatile memory. One subject image and multiple background images are associated with each other, whereby a plurality of composite images can be created from one subject image.

Further, the digital camera according to the invention is characterized in that the subject image output means has first subject image output means for setting a first default image before a shutter command is entered and storing first associating data for associating default image data representing the first default image with subject image data in the nonvolatile memory; and second subject image output means for setting a second default image after a shutter command is entered and storing second associating data for associating default image data representing the second default image with the subject image data associated with the first default image in the nonvolatile memory, and that the first default image and the second associating data are distinguished from each other with respect to the setting time of the default image. If a plurality of combinations of default images and subject images are set, it becomes hard to determine which of the combinations is the combination for bringing the subject image and the default image into harmony with each other, intended by the operator in entering the shutter command. Since the combination of the default image and the subject image set before the shutter command is entered is distinguished from the combination set after the shutter command is entered, the combination for bringing the subject image and the default image into harmony with each other, intended by the operator in entering the shutter command can be determined easily.

Further, the digital camera according to the invention is characterized in that the subject image output means uses a table to associate the default image data with the subject image data. Accordingly, it becomes easy to edit and use the information for associating the default image with the subject image.

Further, the digital camera according to the invention is characterized in that the associating data associates layout definition data for defining playback layout of the subject image and the default image with the subject image data. The subject image data is stored in memory in association with the layout definition data, whereby it is made possible to control the layout of the subject image and the default image for the composite image with the digital camera.

Further, the digital camera according to the invention is characterized in that the digital camera further includes default image selection means for selecting the default image data to be associated with the subject image data before and after a shutter command is entered, and that the associating data associates the default image data selected through the default image selection means with the subject image data through the layout definition data so that whether the default image data associated with the subject image data by the associating data is selected before or after the shutter command is entered can be determined. Whether the default image data representing the default image combined with the subject image is selected before or after the shutter command is entered can be determined by the associating data, so that whether or not the combination of the subject image and the default image determined by the associating data is the combination intended by the operator in entering the shutter command can be determined after the fact just before print, etc.

Further, the digital camera according to the invention is characterized in that the layout definition data contains a plurality of layout definition files each for defining playback layout of the subject image and the default image for each playback medium size and an index file containing paths of the plurality of layout definition files, and that the associating data is stored in a file having a file name at least a part of which matches the file name of the file storing the subject image data and contains the path of the index file. Subject image is stored in the memory in association with a plurality of layout definition files each for defining playback layout of the subject image and the default image for each playback medium size through the an index file, whereby it is made possible to control the layout of the subject image and the default image for the composite image played back on playback media of different sizes for each playback medium size with the digital camera.

Further, the digital camera according to the invention is characterized in that the nonvolatile memory is removable memory. Subject image data is stored in the removable memory, whereby it is made possible to transmit the subject image data through the removable memory to a different image processing apparatus from the digital camera recording the subject image.

Further, the digital camera according to the invention is characterized in that the digital camera further includes playback layout output means for storing the default image data representing a default image and layout definition data for defining playback layout of subject image and the default image in the removable memory. Default image and layout definition data are stored in the removable memory together with subject image data, whereby it is made possible to play back the composite image of the subject image and the default image according to the playback layout defined in the layout definition data in a different image processing apparatus from the digital camera recording the subject image. That is, it is made possible to control the layout of the subject image and the default image for the composite image played back in a different image processing apparatus with the digital camera.

Further, the digital camera according to the invention is characterized in that the layout definition data contains a plurality of layout definition files each for defining playback layout of the subject image and the default image for each playback medium size and an index file containing paths of the plurality of layout definition files, and that the associating data is stored in a file having a file name at least a part of which matches the file name of the file storing the subject image data and contains the path of the index file. Subject image is stored in the removable memory in association with a plurality of layout definition files each for defining playback layout of the subject image and the default image for each playback medium size through the an index file, whereby it is made possible to control the layout of the subject image and the default image for the composite image played back on playback media of different sizes for each playback medium size with the digital camera.

Further, the digital camera according to the invention is characterized in that the digital camera further includes display means for displaying a composite image provided by combining the subject image represented by subject image data and the default image represented by the default image data associated with the subject image data. The composite image provided by combining the subject image and the default image is displayed, whereby it is made possible to check the composite image with the digital camera.

Further, the digital camera according to the invention is characterized in that the digital camera further includes print control means for causing a printer to print a composite image provided by combining the subject image represented by subject image data and the default image represented by the default image data associated with the subject image data. The digital camera causes a printer to print the composite image, whereby it is made possible to easily print the composite image of the subject image recorded in the digital camera without using a personal computer, etc.

Further, the digital camera according to the invention is characterized in that the print control means creates print data of a composite image provided by combining the subject image represented by subject image data and the default image represented by the default image data associated with the subject image data and causes the printer to print the composite image based on the print data. The print data is created in the digital camera, whereby it is made possible to easily print the composite image of the subject image recorded in the digital camera even with a printer that cannot create the print data based on the subject image data and the default image data.

The functions of the plurality of means included in the invention are provided by hardware resources whose functions are determined by the configuration and hardware resources whose functions are determined by programs, or by combining them. The functions of the plurality of means are not limited to those provided by hardware resources physically independent of each other. The invention can be determined not only as the invention of an apparatus, but also as the invention of a program, the invention of a record medium recording the program, and the invention of a method.

BRIEF DESCRIPTION OF THE DRAWINGS

FIG. 4 is a schematic drawing according to the first embodiment of the invention.

FIG. 10 is a schematic drawing according to the second embodiment of the invention.

FIG. 12 is a screen transition drawing according to the second embodiment of the invention.

BEST MODE FOR CARRYING OUT THE INVENTION

Embodiments of the invention will be discussed below based on embodiments.

First Embodiment

Figure 2:
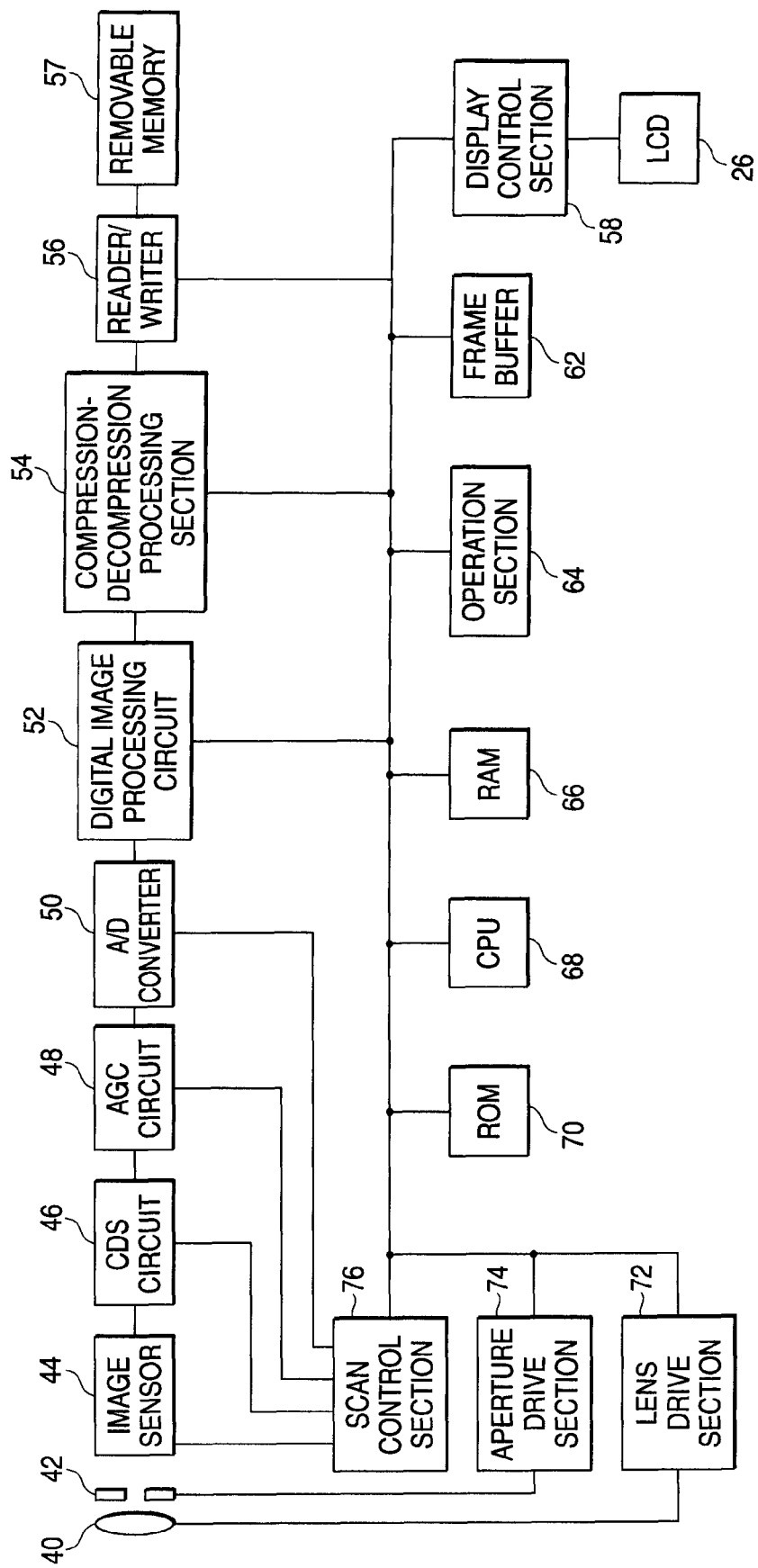
FIG. 2 is a block diagram according to the first embodiment of the invention.
Figure 3:
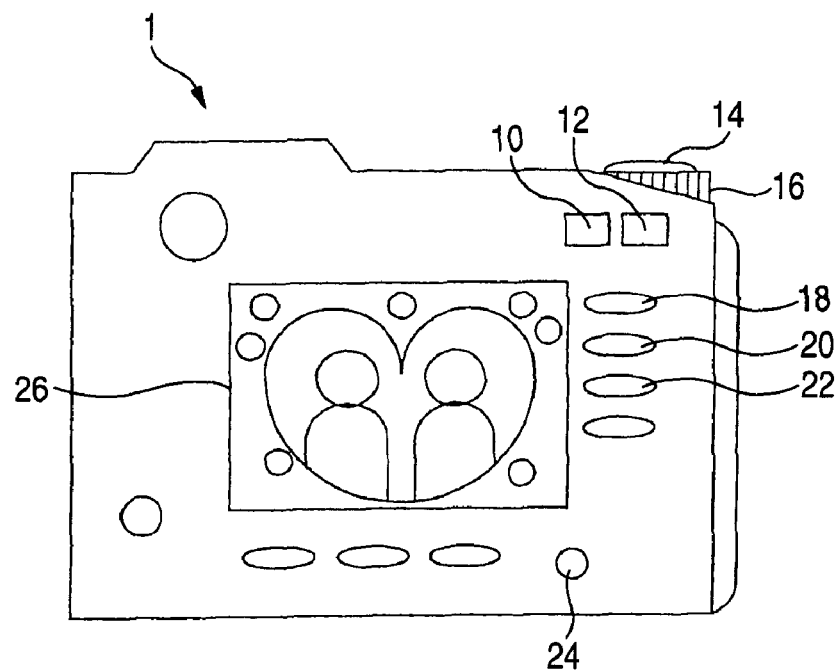
FIG. 3A is a rear view according to the first embodiment of the invention and FIG. 3B is a front view according to the embodiment of the invention.
Figure 3:
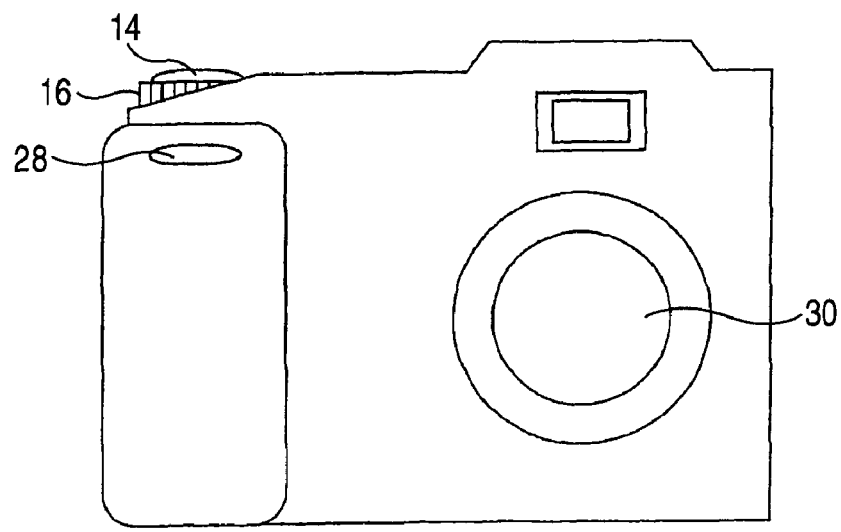

FIG. 2 is a block diagram to show the configuration of a digital camera 1 according to a first embodiment of the invention. FIGS. 3A and 3B are a front view and a rear view to show the appearance of the digital camera 1.

A lens drive section 72 drives a zoom lens 40 so as to form a subject image on the light reception section of an image sensor 44 at the scaling factor responsive to a signal input from a CPU 68. An aperture drive section 74 drives an optical aperture 42 so that the incident light amount on the image sensor 44 becomes the incident light amount responsive to a signal input from the CPU 68.

The image sensor 44 is an area image sensor formed with an on-chip color filter array made up of four complementary color filters of C (Cyan), M (Magenta), Y (Yellow), and G (Green) for storing the charges provided by executing photoelectric conversion of received light for a given time and outputting an electric signal responsive to the light reception amount for each photoelectric conversion element. The color filter array may be made up of three complementary color filters of C, M, and Y or may be made up of primary color filters of R (Red), G (green), and B (Blue).

A CDS circuit 46 performs reduction processing of noise contained in the analog electric signal. An AGC circuit 48 performs gain control, thereby adjusting the level of the analog electric signal. An A/D converter 50 quantizes the analog electric signal subjected to the processing described above into a digital signal of a determined gradation. A scan control section 76 outputs a shift pulse, a vertical transfer pulse, a horizontal transfer pulse, etc., to the image sensor 44 and outputs a drive pulse to the CDS circuit 46, the AGC circuit 48, and the A/D converter 50 to operate these components in synchronization with the image sensor 44.

A digital image processing section 52, which is implemented, for example, as a DSP (Digital Signal Processor), performs image generation processing, white balance correction, γ correction, color space conversion, etc., based on the image signal output from the A/D converter 50, creates subject image data representing R, G, and B gradation values, Y, Cb, and Cr gradation values, etc., for example, for each pixel, and stores the subject image data in RAM 66. The image generation processing mentioned here is processing of mainly generating image data having three gradation values for each pixel by interpolation processing using digital data representing the gradation value of any of CMYG corresponding to output of each photoelectric conversion element.

A compression-decompression processing section 54 compresses the subject image data output from the digital image processing section 52 to create compressed image data in conformity with a JPEG format, for example, in a photographing mode and decompresses the compressed image data read from removable memory 57 using a reader/writer 56 and stores the decompressed image data in the RAM 66 in a playback mode. The removable memory 57 implemented as nonvolatile memory such as flash memory can be attached to and detached from the reader/writer 56, and the reader/writer 56 writes data into the removable memory 57 and reads data stored in the removable memory 57.

An operation section 64 includes various buttons such as a power button 14 for turning on/off power, a dial switch 16 for setting a mode such as the photographing mode, the playback mode, or a direct print mode, a shutter button 28 for entering a shutter command, a background setting button 18 for setting a background in the photographing mode, zoom buttons 10 and 12 for setting the magnification or scaling factor of a zoom lens, a next selection key 20, a preceding selection key 22, and a determination key 24, and a circuit for detecting the user pressing any button and the rotation angle of the dial switch 16.

A display control section 58 performs processing of thinning out the image data stored in the RAM 66 at a fixed scaling factor in response to the display area of the display, color space conversion processing, combining processing, etc., and drives an LCD (Liquid Crystal Display) 26 as the display based on the display data created by performing the processing. A frame buffer 62 contains a background area and a foreground area for separately storing the image data to be combined. The display control section 58 includes a combining processing circuit for displaying a composite image on the LCD 26 by displaying the pixels of the image data stored in the background area taking precedence over the transparent pixels of the image data stored in the foreground area and displaying the opaque pixels of the image data stored in the foreground area taking precedence over the pixels of the image data stored in the background area.

The CPU 68 controls the whole digital camera 1 by executing a computer program stored in ROM 70. The ROM 70 is memory for storing the computer program, etc., for the CPU 68 to execute various types of control. The RAM 66 is memory for temporarily storing various programs and various pieces of data.

The configuration of the digital camera 1 has been described. Next, background data as a default image will be discussed.

FIG. 4 is a schematic drawing to show background files recorded in the removable memory 57.

Figure 1:
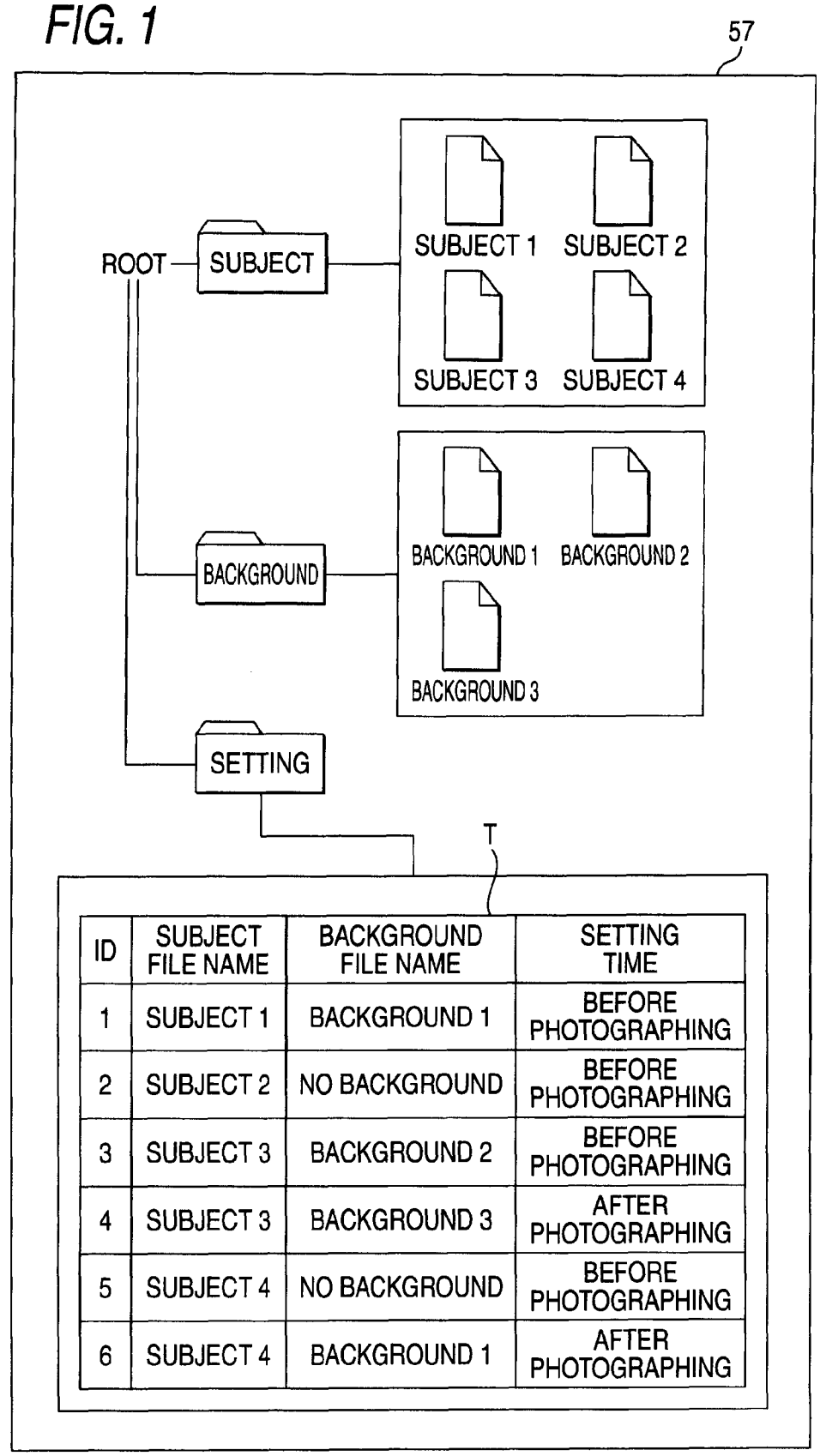
FIG. 1 is a schematic drawing according to a first embodiment of the invention.

The background file, which is provided for creating printed matter of a greeting card with a photo, a photo seal, etc., is transferred from a personal computer, etc., and is previously stored in the ROM 70 or the removable memory 57. In the description that follows, it is assumed that the background files are stored in a background folder of the removable memory 57 as shown in FIG. 1. The background data stored in the background file represents an image 80, 82 made up of a line drawing, fills, text, etc. The hatched area is an area into which the subject image represented by subject image data is fitted (transparent area). As the gradation value of each pixel in the transparent area, a predetermined value representing transparency, such as R=00H, G=00H, B=00H, for example, is set.

The background file is made up of data indicating the number of pixels of the background data, the coordinates with which the origin coordinates of the subject image data are matched (coordinates of composite origin), the number of reference pixels of layout data, the print size, the print orientation of the background data (portrait, landscape), etc., in addition to the background data. At the combining processing time before print, a comparison is made between the number of reference pixels of layout data and the number of pixels of the subject image data to be laid out, the background data is thinned out or interpolated to the size responsive to the number of pixels of the subject image data to be laid out, and the coordinates of the composite origin are converted accordingly.

For example, if the number of pixels of the background data is (1280×640), the coordinates of the composite origin are (20, 20), the number of reference pixels of layout data is (640×480), and the number of pixels of the subject image data is (1280×960), the number of pixels of the subject image data is twice the number of reference pixels in both horizontal and vertical directions and thus the combining processing before print is performed as follows: The background data is interpolated to set the number of pixels of the background data to (2560×1280), the coordinates of the composite origin are converted into (40, 40), and the image represented by the background data and the image represented by the subject image data are combined so that the image represented by the subject image data overlaps in the range of (40, 40) to (1320, 1000) of the image represented by the background data after conversion. At the print time, further interpolation processing, thinning-out processing, or rotation processing is performed based on the print size, the print orientation of the background data, etc., previously stored in the background file, and a composite image of the setup print size and in the setup print orientation is printed on a printer.

If the image represented by the subject image data and the image represented by the background data are combined into a composite image in a personal computer or a stand alone printer and then the composite image is printed and it is not assumed that the digital camera 1 and a printer are directly connected for printing, the true background data used to create composite image data for print may be previously stored in the personal computer or the stand alone printer and display processing in the digital camera 1 may be executed using data with a coarse gradation at a lower resolution than that of the true background data. In doing so, the background data does not put pressure on the memory space of the digital camera 1 and the background data can be processed at high speed.

The background data has been described. Next, the operation of the digital camera 1 will be discussed.

Figure 5:
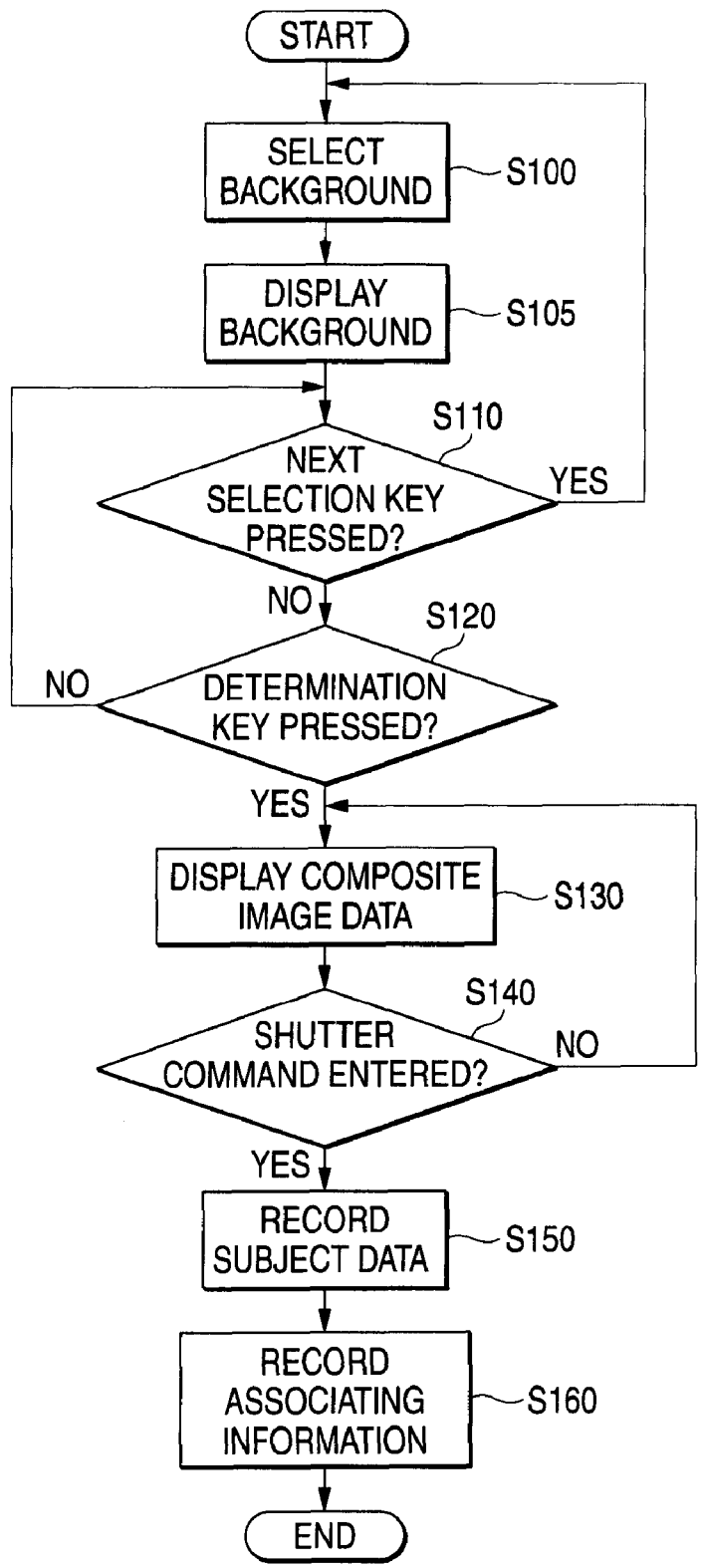
FIG. 5 is a flowchart according to the first embodiment of the invention.

FIG. 5 is a flowchart to show a processing flow for storing subject image data in the removable memory 57 in association with background data before photographing. The sequence shown in FIG. 5 is started as an operator presses the background setting button 18 in the photographing mode determined by the rotation angle of the dial switch 16.

At step S100, any one of the background files stored in the removable memory 57 is selected. At step S105, the background image represented by the background data stored in the selected background file is displayed on the LCD 26. At step S110, when the next selection key 20 is pressed, the process returns to step S100 and another background file is selected and the above-described processing is repeated.

When the determination key 24 is pressed at step S120, at step S130, the subject image is displayed as a moving image in the transparent area of the image represented by the background data. Accordingly, it is made possible to create the subject image data representing an image in harmony with the image represented by the background data selected as the determination key 24 is pressed at step S120. Specifically, the background data selected at steps S100 to A120 and the subject image data created by the digital image processing section 52 are stored in the frame buffer 62 and the display control section 58 combines the subject image data and the background data stored in the frame buffer 62 and outputs a drive signal to the LCD 26, whereby composite image data 83 is displayed as shown in FIG. 3(A). The subject image data is updated every predetermined time.

At step S140, whether or not a shutter command is entered, namely, whether or not the shutter button 28 is pressed is detected. If the shutter button 28 being pressed is not detected, the process returns to step S130 and the above-described processing is repeated. If the shutter button 28 being pressed is detected at step S140, the process goes to step S150.

At step S150, a predetermined control signal is input to the scan control section 76, the charges accumulated in the image sensor 44 for a predetermined time are scanned, subject image data is created in the digital image processing section 52, and the subject image data is compressed by the compression-decompression processing section 54 to create compressed image data, which is then stored in a subject folder of the removable memory 57 by the reader/writer 56 in a predetermined file format such as JPEG.

At step S160, information to associate the subject image data recorded at step S150 and the background file selected as the determination key 24 is pressed at step S110 with each other is stored in the removable memory 57. Specifically, an associating record is created with the file name of the subject image data recorded at step S150 as "subject file name," the file name of the background file selected as the determination key 24 is pressed at step S110 as "background file name," and before photographing as "setting time," and is added to a setting table T shown in FIG. 1. The associating record added at this time corresponds to first associating data as claimed in Claims.

Here, the setting table T for managing the information to associate the subject image data and the background file with each other will be discussed. The setting table T is recorded in a setting folder of the removable memory 57. The setting table T is made up of associating records for associating the subject files and the background files with each other in a one-to-one correspondence. Each associating record is made up of ID, subject file name, background file name, and setting time. The "subject file name" is data for uniquely identifying the subject file storing subject image data in a file system of the digital camera 1, personal computer, etc. The "background file name" is data for uniquely identifying the background file in the file system of the digital camera 1, personal computer, etc. The "setting time" is data indicating whether the associating record is created before photographing or is created or edited after photographing. That is, the associating record with before photographing as the "setting time" is an associating record created at step S160 and an associating record not edited later. The associating record with after photographing as the "setting time" is an associating record added or overwritten in a background setting mode described later. Whether or not the "setting time" is before photographing is determined, whereby it is made possible to determine whether or not the combination of the background file and the subject file associated with each other according to the associating record is a combination for bringing the subject and the background into harmony with each other, intended by the operator in entering the shutter command. When the shutter command is entered in a state in which no background data is set, an associating record with "no background" set in the "background file name" may be created and be added to the setting table each time for each shutter command.

An unlimited number of associating records each for associating a subject file and a background file with each other in any combination can be added to the setting table T within the upper limit of the memory capacity. Associating records for associating different background files with one subject file (in the example in FIG. 1, associating records with ID 3 and ID 4) can be created. Therefore, using the setting table T, information for associating two or more background files with one subject file can be stored in the removable memory 57.

The subject image data and the background data may be associated with each other not only according to a table, but also according to a directory or may be associated with each other by storing the file name of the associated file in the subject file or the background file.

The processing flow of storing the information to associate the subject image data with the background data in the removable memory 57 has been described. Next, processing of setting associating of subject image data and background data with each other after photographing will be discussed.

Figure 6:
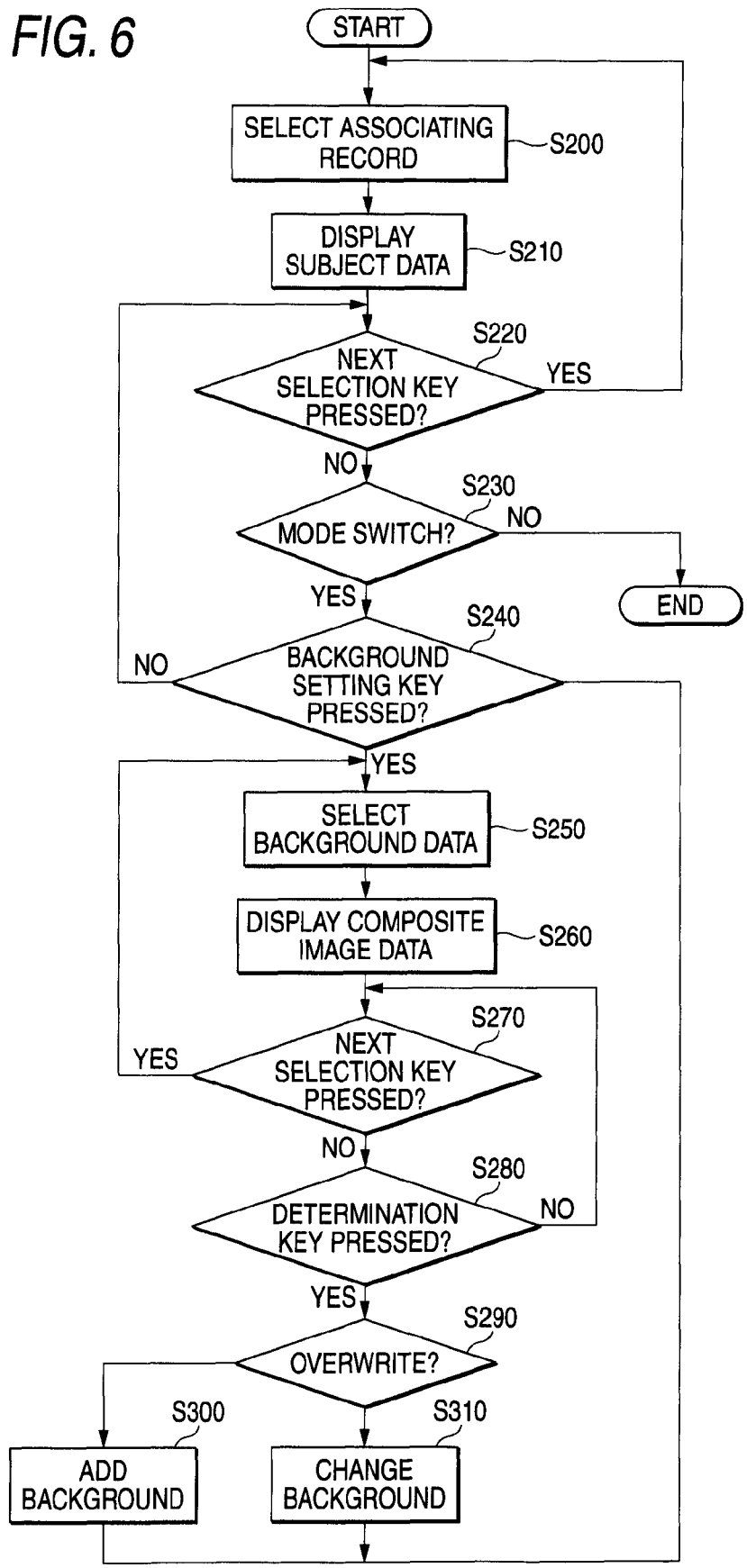
FIG. 6 is a flowchart according to the first embodiment of the invention.

FIG. 6 is a flowchart to show the processing. The sequence shown in FIG. 6 is started as the rotation angle of the dial switch 16 corresponding to the playback mode is detected in the operation section 64.

Figure 7:
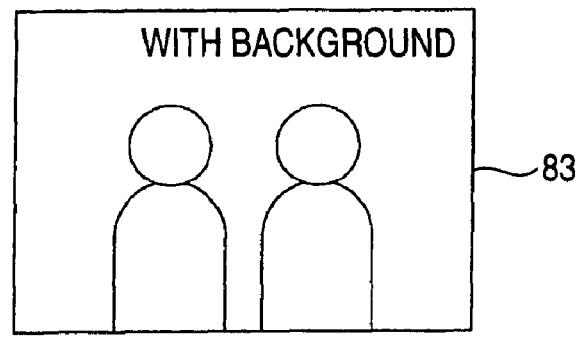
FIG. 7 is a schematic drawing according to the first embodiment of the invention.
Figure 7:
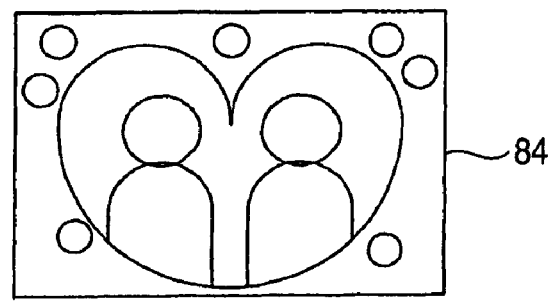
Figure 7:
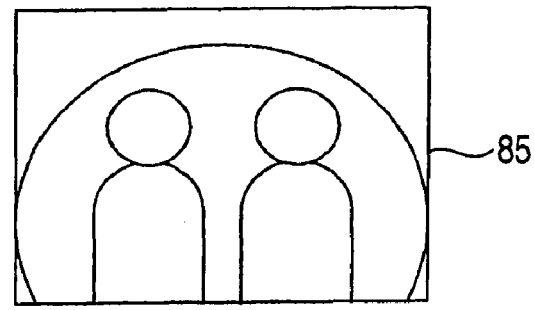

At step S200, any one of the associating records stored in the setting table T is selected. At step S210, the subject image data with the subject file name stored in the selected associating record is displayed on the LCD 26. At this time, if a background file is associated with the subject file in the selected associating record, text or an icon indicating the fact is combined with the subject for display as shown in FIG. 7(A).

At step S220, whether or not the next selection key 20 is pressed is detected. If the next selection key 20 is pressed, the process returns to step S200 and another associating record is selected and the above-described processing is repeated. If the next selection key 20 is not pressed at step S220, the process goes to step S230 and whether or not a mode switch command is entered, namely, whether or not the rotation angle of the dial switch 16 is changed is detected. If a mode switch command is entered, the playback mode is terminated and is switched into another mode. If a mode switch command is not entered at step S230, the process goes to step S240 and whether or not the background setting key 18 is pressed is detected. If the background setting key 18 is pressed, the process goes to step S250 and a transition is made to the background setting mode. The mode for executing the processing sequence of steps S250 to S310 is called the background setting mode. If the background setting key 18 is not pressed at step S240, the process returns to step S220 and the above-described processing is repeated.

At step S250, any one of the background files stored in the removable memory is selected. In the first processing executed just after step S240, the background file associated according to the associating record selected at step S200 is selected. At step S260, the image represented by the subject image data associated according to the currently selected associating record and the image represented by the background data selected at step S250 are combined and the composite image is displayed on the LCD 26. Specifically, the background data and the subject image data are stored in the frame buffer 62 and the display control section 58 combines the subject image data and the background data stored in the frame buffer 62 and outputs a drive signal to the LCD 26, whereby composite image data 84 shown in FIG. 7(B) is displayed.

At step S270, whether or not the next selection key 20 is pressed is detected. If the next selection key 20 is pressed, the process returns to step S250, another piece of background data is selected, the above-described processing is repeated, and composite image data 85, for example, shown in FIG. 7(C) is displayed. If the next selection key 20 is not pressed, the process goes to step S280 and whether or not the determination key 24 is pressed is detected. Steps S270 and S280 are repeated until the next selection key 20 or the determination key 24 is pressed. If the determination key 24 is pressed, the process goes to step S290.

At step S290, to record information for associating the subject image data associated according to the currently selected associating record and the background file selected at step S250 with each other in the setting table T, the operator is requested to select overwriting the currently selected associating record or adding a new associating record. Specifically, for example, buttons of "yes" and "no" are displayed on the LCD 26 together with a character string of "do you overwrite?" and the operator is requested to select either of the buttons of "yes" and "no" by pressing the next selection key 20, the preceding selection key 22, and the determination key 24.

If the operator selects overwriting at step S290, the process goes to step S300 and the background file name in the currently selected associating record is changed to the file name of the background data selected at step S250 and "setting time" in the associating record is changed to "after photographing."

If the operator does not select overwriting at step S290, the process goes to step S310 and a new associating record is created with the subject file name in the currently selected associating record as "subject file name," the file name of the background data selected at step S250 as "background file name," and "setting time" as "after photographing" and is added to the setting table T. The associating record added at this time corresponds to second associating data as claimed in Claims. Upon completion of the processing at step S300 or S310, the process returns to step S240 and the above-described processing is repeated.

The processing of setting associating of the subject image data and the background data with each other after photographing has been described. In the first embodiment of the invention, image processing means as claimed in Claims is made up of the CDS circuit 46, the AGC circuit 48, the A/D converter 50, the digital image processing section 52, etc., and the function is realized as the processing at steps S130 and S150 is performed. The functions of subject image output means, first subject image output means, and second subject image output means as claimed in Claims are realized as the processing at steps S100, S105, S110, S120, and S160 is performed in the photographing mode and are realized as the processing at steps S250 to S310 is performed in the background setting mode. Particularly, the function of the first subject image output means as claimed in Claims corresponds to the processing at steps S100, S105, S110, and S120 in the photographing mode, and the function of the second subject image output means as claimed in Claims corresponds to the processing at steps S250 to S310 in the background setting mode.

In the first embodiment of the invention described above, the subject image data rather than the data provided by combining the subject image data and the background data is stored in the removable memory 57 and the subject image data and the background data are associated with each other according to the associating record stored in the setting table T. Therefore, the subject image data can be recorded in the removable memory 57 so that it can be drawn as it is combined with the selected background data and that it can be drawn separately from the selected background data. Further, if records for associating two or more pieces of background data with one piece of subject image data are stored in the setting table T, the subject image data, the background data, and the setting table T stored in the removable memory 57 are read in a personal computer, etc., and the subject image data and the background data are combined based on the setting table T, whereby a plurality of composite images can be created from one subject image data piece recorded with the digital camera 1.

In the first embodiment of the invention, the information for associating the subject image data and the background data with each other is managed using the table, so that the information for associating the subject image data and the background data with each other can be easily edited and used.

Second Embodiment

Figure 8:
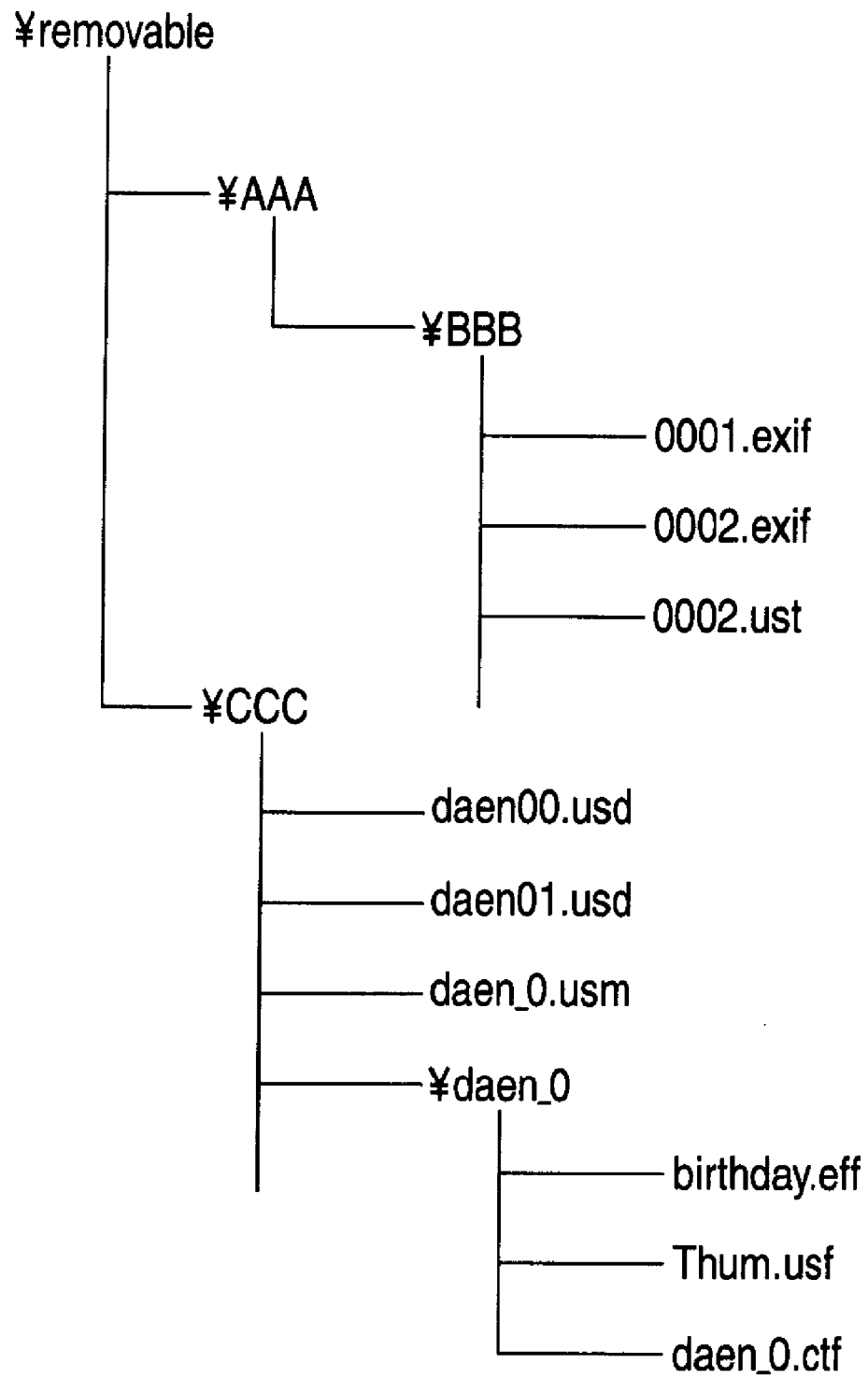
FIG. 8 is a schematic drawing according to a second embodiment of the invention.

FIG. 8 is a schematic drawing to show directories of files stored in removable memory 57 with a digital camera 1 according to a second embodiment. "¥removable" corresponds to the root directory of the removable memory 57. Components in the second embodiment substantially identical with those in the first embodiment are denoted by the same reference numerals in the second embodiment and will not be discussed again.

A subject image file with extension ".exif" contains image data representing the subject image formed on an image sensor 44 when a shutter button 28 is pressed, and is created in a digital image processing section 52.

A file with extension ".ust" is an associating file for associating a subject image file and a layout definition file with each other. The filename of an index file with extension ".usm" is described in the associating file. The filename of the associating file is the same as the filename of the subject image file to be associated with the layout definition file described in the index file described in the associating file. For example, a filename of an index file, "daen_0.usm," is described in an associating file "0002.ust" and the filenames of layout definition files "daen01.usd," "daen02.usd," etc., are described in the index file "daen_0.usm." That is, the subject image and the associating file are associated with each other according to their filenames, and the associating file and the index file are associated with each other according to the filename described in the associating file. Further, the index file and the layout definition file are associated with each other according to the filename of the layout definition file described in the index file. The files are associated with each other, whereby a plurality of layout definition files different in paper size and having similitude relation are associated with one subject image file.

If a layout definition file is selected by menu operation before the shutter button 28 is pressed, the associating file is stored in the removable memory 57 together with the subject image file when the shutter button 28 is pressed. As a transition is made from a playback mode to a background setting mode, the layout definition file can be associated with the subject image data already stored in the removable memory 57. In each associating file, text information indicating whether the associating file is set before the shutter button 28 is pressed or is set in the background setting mode is described.

A file with extension ".usd" is a layout definition file for defining the print layout of a subject image and a default image and the layout definition file is retained for each paper size. The layout definition file is described later in detail.

Figure 9:
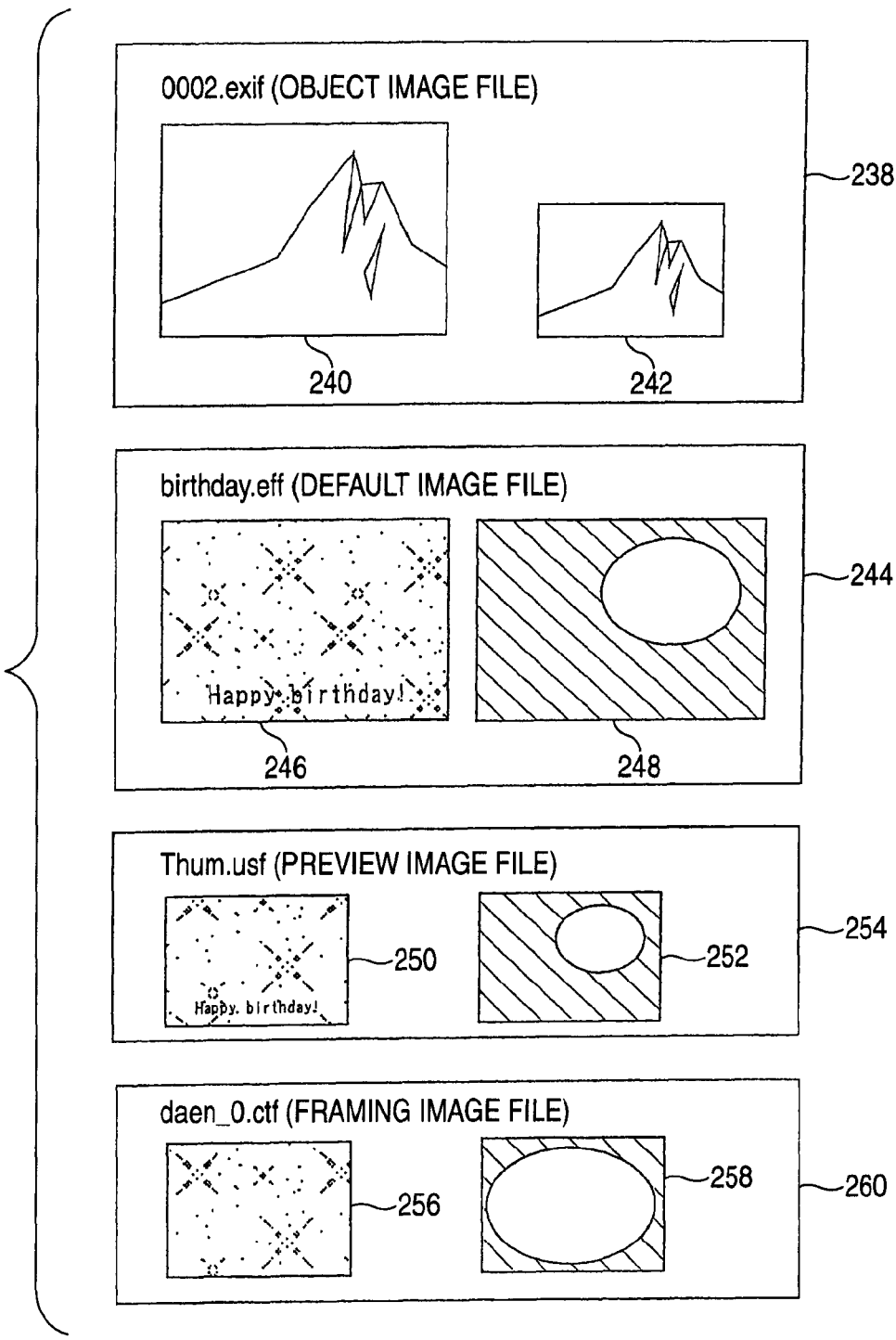
FIG. 9 is a schematic drawing according to the second embodiment of the invention.

FIG. 9 is a schematic drawing to show various images stored in the removable memory 57 in association with each other through the layout definition file.

A subject image file 238 with extension ".exif" contains data representing a subject image, essential image data 240 and thumbnail image data 242, which are recorded in an Exif file format.

A default image file 244 with extension ".eff" contains data representing a default image combined with a subject image based on the layout definition file, default image data 246 and α channel data 248. The α channel data is data setting the transmittance of the upper layer between superposed layers for each pixel. For example, in pixels with the transmittance set to 100% by the α channel data, a pixel in the lower layer rather than a pixel in the upper layer is adopted as a pixel of a composite image. If a script for drawing a default image is described in the layout definition file, the subject image and the default image are related to each other through the layout definition file.

A preview image file 254 with extension ".usf" contains data to display the layout defined in the layout definition file on an LCD 26, preview image data 250 and α channel data 252. The preview image file 254 is displayed in a mode of selecting the layout definition file to be associated with the subject image file before the shutter button 28 is pressed and the background setting mode to which a transition can be made from the playback mode. The size of a preview image is matched with the size of a thumbnail image defined in the industrial standard such as Exif, for example, whereby it is made possible to display the layout defined in the layout definition file at high speed using hardware for displaying the thumbnail image data of subject images at high speed.

A framing image file 260 with extension ".ctf" contains data to display a part of the default image defined in the layout definition file (framing image) on an LCD of a digital camera, framing image data 256 and α channel data 258. In a photographing mode, a framing image is displayed on the LCD 26, whereby appropriate framing responsive to the shape of the frame into which a default image is fitted is made possible.

As shown in FIG. 8, the data representing a default image, the data representing a preview image, and the data representing a framing image are stored in the folder of the same name as the filename of the index file describing the filenames of the layout definition files corresponding to the data.

The layout definition file, the index file, the default image file, the preview image file, and the framing image file may be stored only in ROM 70 or may be stored in the removable memory 57 until the associating file is stored in the removable memory 57. When the associating file is stored in the removable memory 57, if the layout definition file, the index file, the default image file, the preview image file, and the framing image file are not stored in the removable memory 57, these files are stored in the removable memory 57 together with the associating file.

Figure 11:
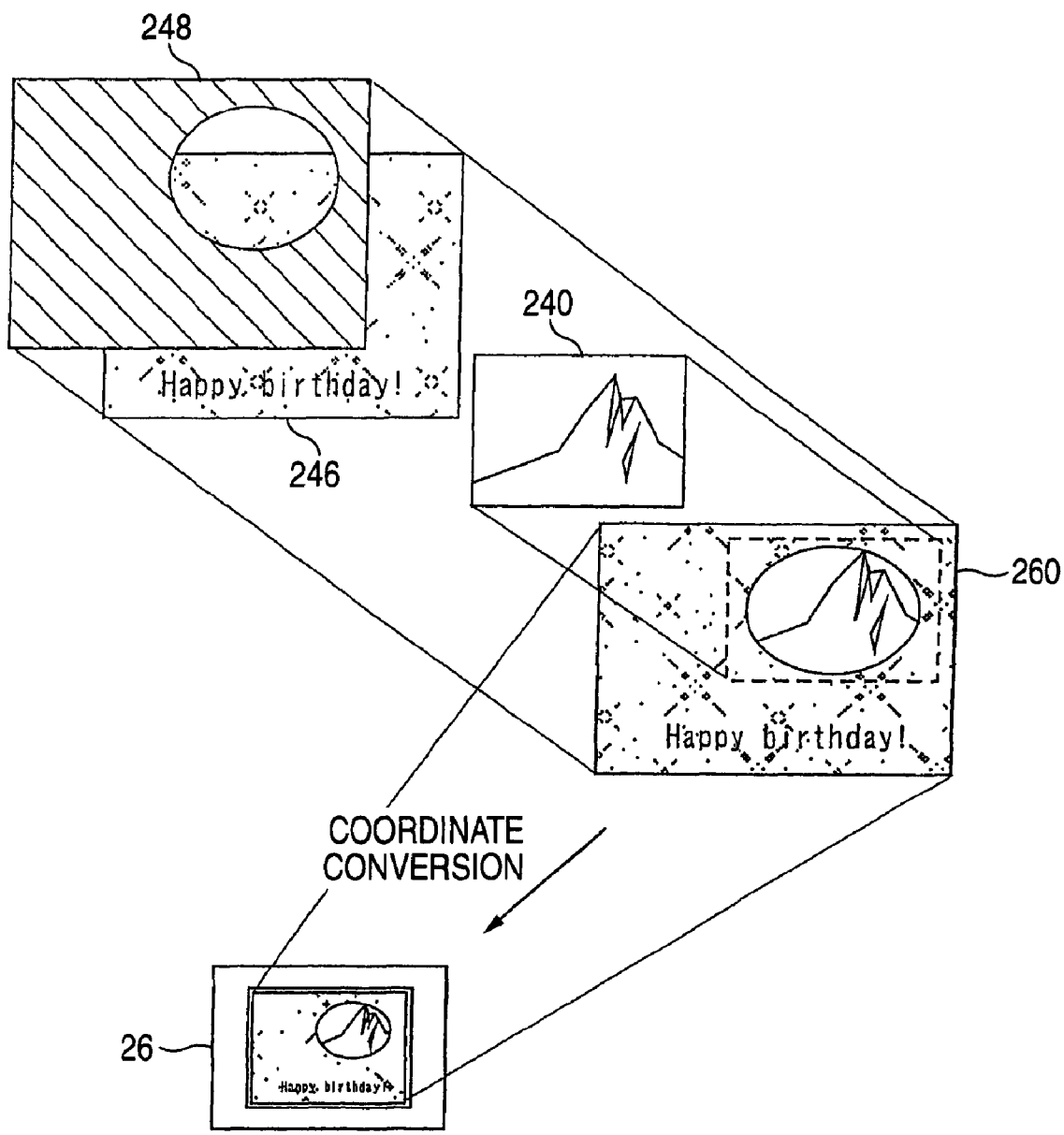
FIG. 11 is a schematic drawing according to the second embodiment of the invention.

FIG. 10 is a schematic drawing to show the contents of a layout definition file. FIG. 11 is a schematic drawing to show processing of laying out a subject image and a default image for a postcard 260 using the layout definition file when a print command is accepted in the digital camera 1 directly connected to a printer or when a print command is accepted in a printer to which data can be input from the removable memory 57. Processing of creating print data of a composite image using the layout definition file, the subject image file, the default image file, etc., may be performed by a CPU 68 of the digital camera 1 or a CPU of a printer. To create print data by the CPU 68 of the digital camera 1, one-page image data to be printed is created using the layout definition file, the subject image file, the default image file, etc., and further color space conversion processing, resolution conversion processing, halftone processing, interlace processing, etc., is performed for the image data to be printed to create print data, and the print data is sent to a printer through an interface such as USB. To create print data by the CPU of the printer, the layout definition file, the subject image file, and the default image file may be input to the printer through an interface such as USB or the removable memory 57 and the layout definition file may be interpreted in the printer. To directly connect the digital camera 1 and a printer for print, the digital camera 1 may send only the default image file corresponding to the paper size selected by the user through menu operation of the digital camera 1 to the printer.

In the layout definition file, the layout of the subject image and the default image is defined by a script. The script defines the print paper size, the print paper orientation, the image frames to place the subject image and the default image on print paper, etc., so that they can be interpreted uniquely in a printer, etc. Specifically, for example, "postcard" as the paper size and "landscape" as the print paper orientation are described by the script, the image frame (for example, upper left coordinates of the frame "(x1, y1)" and lower right coordinates of the frame "(x2, y2)") is described by the script for each subject image to be printed, and the filename of the default image file (for example, "birthday.eff") and the image frame (for example, upper left coordinates of the frame "(x3, y3)" and lower right coordinates of the frame "(x4, y4)") are described by the script for each default image to be printed.

FIG. 12 is a drawing to show screen transition of the LCD 26 in the mode in the playback mode. FIG. 12(A) shows a screen on which a subject image stored in the removable memory 57 is displayed. To display the subject image being selected, the essential image data of the subject image may be read from the removable memory 57 and scaled down before display, the thumbnail image data of the subject image may be read and displayed intact, or the thumbnail image data of the subject image may be read and scaled up or down before display. If a default image is associated with the subject image selected as the next selection key 20 or the preceding selection key 22 is pressed, a part of the default image is displayed as shown in FIG. 12(B1) or text, icon, etc., indicating that the default image is associated is displayed together with the subject image, as shown in FIG. 12(B2). If the determination switch 24 is pressed in a state in which the subject image with which a default image is associated is displayed on the LCD 26, the whole of the image into which the subject image and the default image are combined is displayed on one screen, as shown in FIG. 12(C).

In the playback mode, one of the subject image files stored in a predetermined directory of the removable memory 57 is selected in order each time the next selection key 20 or the preceding selection key 22 is pressed. If the associating file of the same filename as the selected subject image file is stored in the directory, a screen indicating that a layout definition file is associated with the selected subject image file is displayed on the LCD 26 as shown in FIG. 12(B1) or FIG. 12(B2). In this state, if the print start is accepted in the digital camera 1, the selected subject image file is printed in accordance with the script described in the layout definition file associated with the subject image file.

Figure 13:
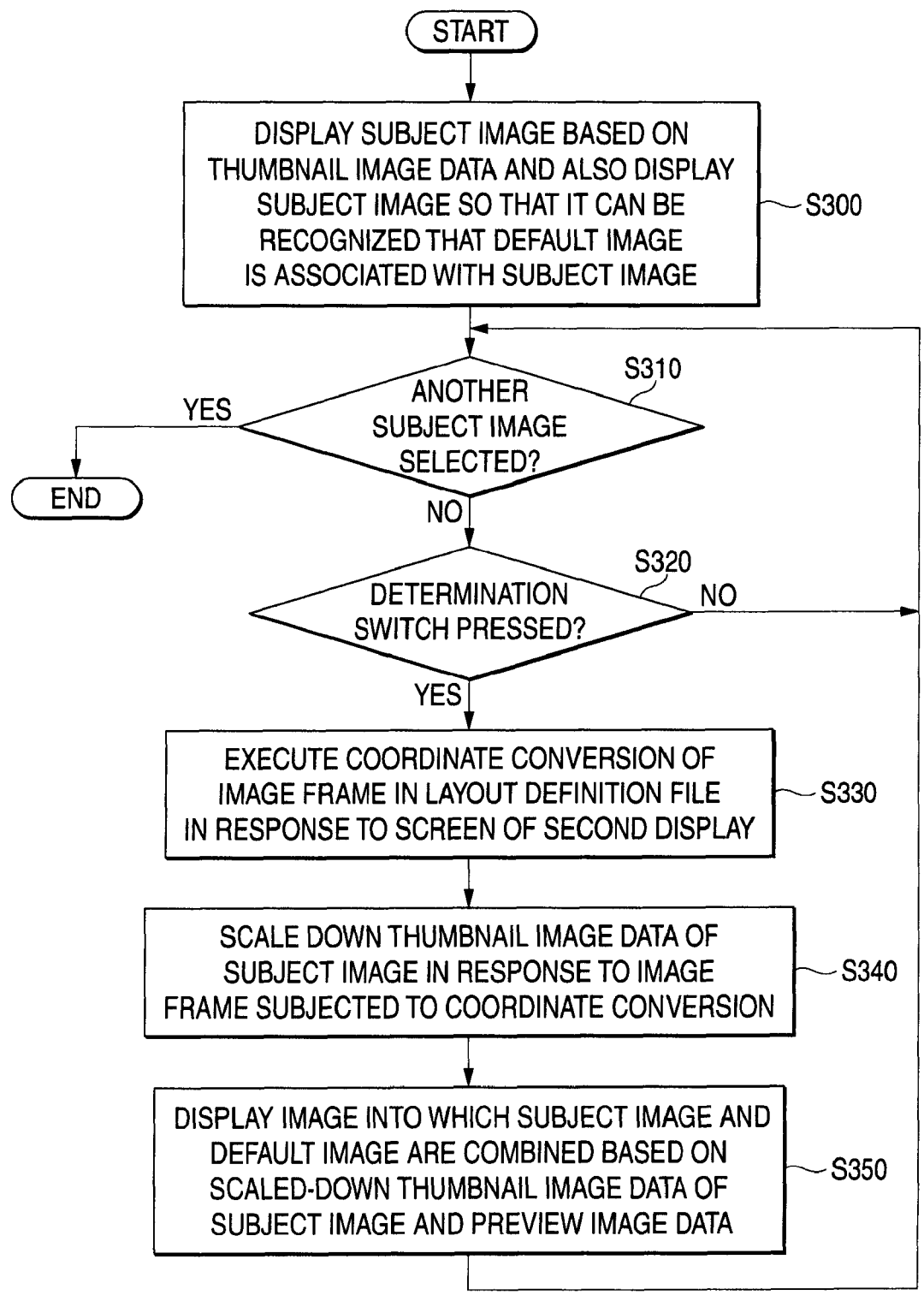
FIG. 13 is a flowchart according to the second embodiment of the invention.

FIG. 12(B1) and FIG. 12(B2) show a state in which "0002.exif" shown in FIG. 8 is selected. Processing when a subject image file stored in the removable memory in association with default image data is selected in the playback mode will be discussed below with reference to a flowchart of FIG. 13:

First, the thumbnail image data 242, the framing image data 256, and the α channel data 258 shown in FIG. 9 are read from the removable memory 57, and the thumbnail image data 242 and the framing image data 256 are superposed on each other on the LCD 26 as shown in FIG. 12(B1) (S300). To display screen A in FIG. 12 (B2) and FIG. 14, image data representing "with frame" stored in the ROM of the control section 212 may be displayed in the upper layer of the thumbnail image data 242 of the subject image.

If the next selection key 20 or the preceding selection key 22 is pressed in a state in which the subject image is displayed on the LCD 26, another subject image file is selected (S310).

If the determination switch 24 is pressed in a state in which the subject image is displayed on the LCD 26, the following processing for displaying the whole of the image into which the subject image and the default image are combined on one screen is started (S320): The following processing may be started when a timer started when a new subject image file was selected times out.

First, the layout definition file is read and coordinate conversion of the image frame described in the script is executed in response to the screen of the LCD 26 as shown in FIG. 11 (S330). A file describing the script defining the image frame responsive to the screen of the LCD 26 may be previously associated with the index file, etc., for storage. In this case, it is not necessary to read the layout definition file and it is not necessary either to execute coordinate conversion of the image frame in the layout definition file.

Figure 14:
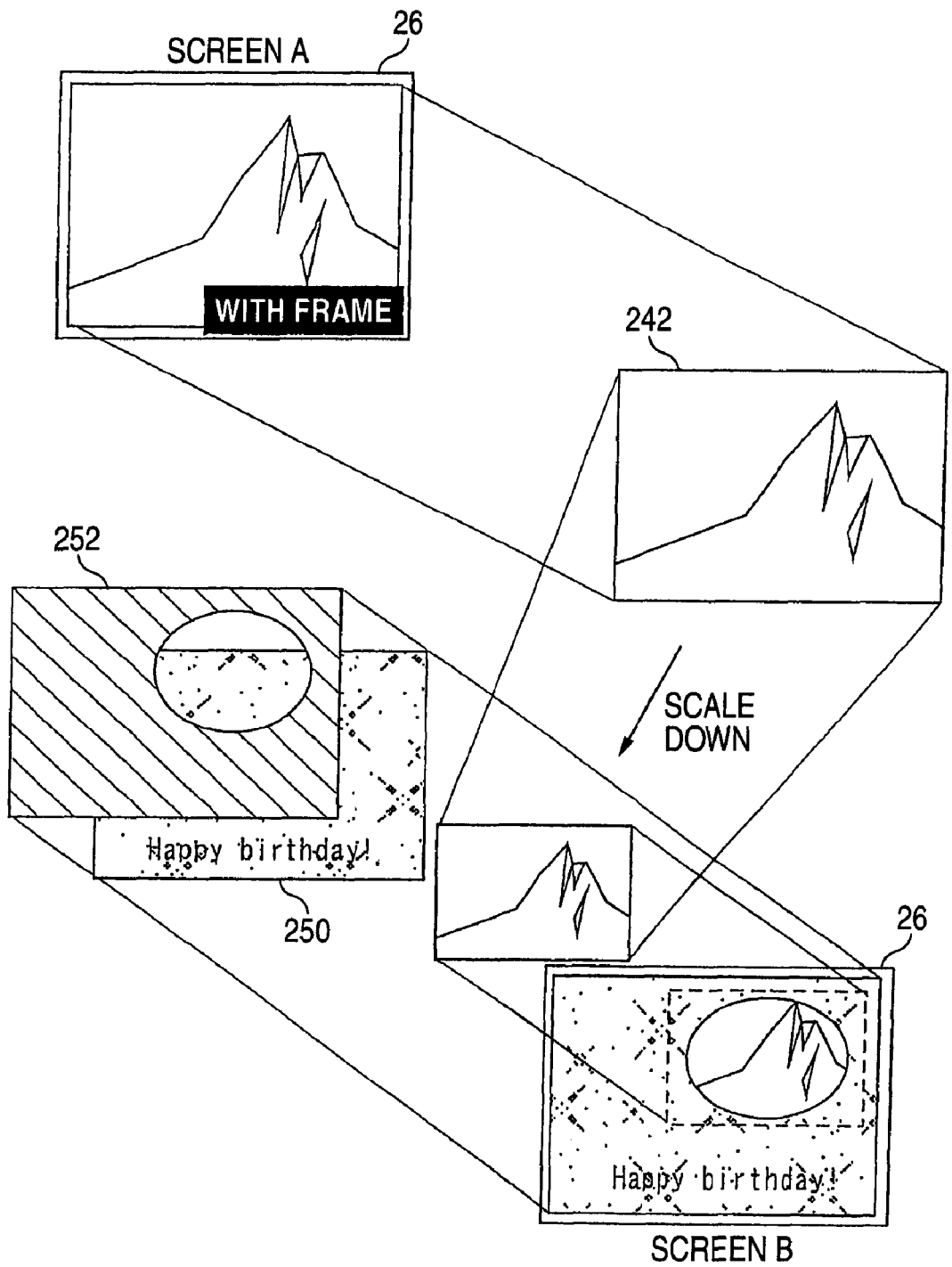
FIG. 14 is a schematic drawing according to the second embodiment of the invention.

Next, the thumbnail image 242 representing the subject image is scaled down in response to the image frame subjected to the coordinate conversion as shown in FIG. 14 (S340).

Next, the preview image data 250 and the α channel data 252 in the preview image file associated with the subject image file through the index file are read from the removable memory 57. Subsequently, the whole of the image into which the subject image and the default image are combined is displayed on one screen of LCD 26 based on the scaled-down thumbnail image 242, the preview image data 250, and the α channel data 252, as shown in screen B in FIG. 14. In this state, if the print start is accepted in the digital camera 1, the selected subject image file is printed in accordance with the script described in the layout definition file associated with the subject image file.

What is claimed is:

1. A digital camera comprising:
an image processor, which creates subject image data representing a subject image based on output of an image sensor;
a subject image output unit, which stores, in a nonvolatile memory that stores:
layout definition data defining a first frame for arranging the subject image and a second frame for arranging a default image to be combined with the subject image; and
default image data representing the default image,
the subject image data and associating data for associating the layout definition data with the subject image data; and
a default image selector, selecting the default image data to be associated with the subject image data at at least one of times before and after a shutter command is entered,
wherein the associating data associates the default image data selected through the default image selector with the subject image data through the layout definition data so that whether the default image data associated with the subject image data by the associating data is selected at the at least one of the times before or after the shutter command is entered can be determined.

2. The digital camera as claimed in claim 1, wherein the nonvolatile memory is a removable memory.

3. The digital camera as claimed in claim 2, further comprising:
a layout output unit, which stores the default image data and the layout definition data in the removable memory.

4. The digital camera as claimed in claim 1, wherein:
the layout definition data contains a plurality of layouts each for defining a layout of the subject image and the default image for each medium size,
the layout definition data contains an index file containing paths of the plurality of layouts,
the associating data contains a path of the index file, and
the associating data is stored in a file having a file name at least a part of which matches a file name of a file storing the subject image data.

5. The digital camera as claimed in claim 1, further comprising:
a display unit, which displays a composite image provided by combining the subject image and the default image.

6. The digital camera as claimed in claim 1, further comprising:
   a print control unit, which causes a printer to print a composite image provided by combining the subject image and the default image.

7. The digital camera as claimed in claim 6, wherein:
   the print control unit creates print data of the composite image and causes the printer to print the composite image based on the print data.

8. The digital camera as claimed in claim 1, wherein:
   the layout definition data contains a plurality of layouts for a first size medium which is selected by a user and another size medium,
   the default image for the first size medium is output, and
   the default image for the another size medium is not output.

9. A digital camera comprising:
   an image processor, which creates subject image data representing a subject image based on output of an image sensor; and
   a subject image output unit, which stores, in a nonvolatile memory that stores:
      layout definition data defining a first frame for arranging the subject image and a second frame for arranging a default image to be combined with the subject image; and
      default image data representing the default image,
   the subject image data and associating data for associating the layout definition data with the subject image data,
   wherein the layout definition data contains a plurality of layouts each for defining layout of the subject image and the default image for each medium size, and
   wherein:
      the layout definition data contains an index file containing paths of the plurality of layouts,
      the associating data contains a path of the index file, and
      the associating data is stored in a file having a file name at least a part of which matches a file name of a file storing the subject image data.

10. A digital camera comprising:
    an image processor, which creates subject image data representing a subject image based on output of an image sensor; and
    a subject image output unit, which stores, in a nonvolatile memory that stores:
       layout definition data defining a first frame for arranging the subject image and a second frame for arranging a default image to be combined with the subject image; and
       default image data representing the default image,
    the subject image data and associating data for associating the layout definition data with the subject image data,
    wherein the layout definition data contains a plurality of layouts each for defining layout of the subject image and the default image for each medium size, and
    wherein:
       the layout definition data contains the plurality of layouts for a first size medium which is specified by a user and another size medium,
       the default image for the first size medium is output, and
       the default image for the another size medium is not output.

* * * * *

UNITED STATES PATENT AND TRADEMARK OFFICE
CERTIFICATE OF CORRECTION

| | |
|---|---|
| PATENT NO. | : 8,098,298 B2 |
| APPLICATION NO. | : 12/137759 |
| DATED | : January 17, 2012 |
| INVENTOR(S) | : Shuji Tsuji, Yasumasa Nakajima and Masanobu Shirakawa |

Page 1 of 1

It is certified that error appears in the above-identified patent and that said Letters Patent is hereby corrected as shown below:

Title Page should read

Related U.S. Application Data
(63) Continuation of application No. 11/003,761, filed on Dec. 6, 2004, now Pat. No. 7,466,350, which is a continuation of application No. PCT/JP03/07138, filed on Jun. 5, 2003.

Signed and Sealed this
Thirty-first Day of July, 2012

David J. Kappos
*Director of the United States Patent and Trademark Office*